United States Patent
Katsavounidis et al.

(10) Patent No.: US 11,863,814 B2
(45) Date of Patent: Jan. 2, 2024

(54) TEMPORAL PLACEMENT OF A REBUFFERING EVENT

(71) Applicant: Netflix, Inc., Los Gatos, CA (US)

(72) Inventors: Ioannis Katsavounidis, San Jose, CA (US); Mark Watson, San Francisco, CA (US); Aaron Hipple, Portola Valley, CA (US); Will Wolcott, San Francsco, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 17/811,385

(22) Filed: Jul. 8, 2022

(65) Prior Publication Data
US 2022/0345776 A1   Oct. 27, 2022

Related U.S. Application Data

(63) Continuation of application No. 17/243,389, filed on Apr. 28, 2021, now Pat. No. 11,388,472, which is a
(Continued)

(51) Int. Cl.
*H04N 21/234*   (2011.01)
*H04N 21/44*   (2011.01)
(Continued)

(52) U.S. Cl.
CPC ..... *H04N 21/44004* (2013.01); *G06F 16/783* (2019.01); *H04N 21/23418* (2013.01);
(Continued)

(58) Field of Classification Search
CPC ............................................... H04N 21/23406
See application file for complete search history.

(56) References Cited

U.S. PATENT DOCUMENTS 9,584,787 B1 *   2/2017   Belovay ................ H04L 65/613
10,425,683 B2   9/2019   Katsavounidis et al.
(Continued)

FOREIGN PATENT DOCUMENTS

AU   2018275194 A1   11/2019
BR   112019024004-7 A2   6/2020
(Continued)

OTHER PUBLICATIONS

Non-Final Office Action received for U.S. Appl. No. 15/610,053 dated Nov. 19, 2018, 16 pages.
(Continued)

*Primary Examiner* — Michael H Hong
(74) *Attorney, Agent, or Firm* — Greenberg Traurig, LLP

(57) ABSTRACT

A method includes receiving, with a computing system, data representing a video item into a buffer. The method further includes outputting the video item from the buffer to a display system. The method further includes determining that utilization of the buffer falls below a predetermined threshold. The method further includes, in response to determining that the utilization of the buffer falls below the predetermined threshold, determining that there is a specified rebuffering point within a predetermined time frame. The method further includes pausing with the computing system, the video item at the specified rebuffering point in response to determining that there is the specified rebuffering point within the predetermined time frame.

20 Claims, 6 Drawing Sheets

Related U.S. Application Data continuation of application No. 16/536,298, filed on Aug. 8, 2019, now Pat. No. 11,025,986, which is a continuation of application No. 15/610,053, filed on May 31, 2017, now Pat. No. 10,425,683.

(51) Int. Cl.
*G06F 16/783* (2019.01)
*H04N 21/432* (2011.01)
*H04N 21/433* (2011.01)
*H04N 21/61* (2011.01)

(52) U.S. Cl.
CPC ......... *H04N 21/432* (2013.01); *H04N 21/433* (2013.01); *H04N 21/44008* (2013.01); *H04N 21/23406* (2013.01); *H04N 21/6125* (2013.01)

(56) References Cited

U.S. PATENT DOCUMENTS

| | | | |
|---|---|---|---|
| 2004/0172478 A1 | 9/2004 | Jacobs et al. | |
| 2007/0260743 A1* | 11/2007 | Oijer | H04L 65/1101 709/231 |
| 2008/0109556 A1* | 5/2008 | Karlberg | H04N 21/44008 375/E7.014 |
| 2014/0241415 A1 | 8/2014 | Su et al. | |
| 2014/0282690 A1* | 9/2014 | Keohane | H04N 21/44004 725/32 |
| 2015/0312369 A1* | 10/2015 | Birch | H04L 67/5681 709/213 |
| 2017/0034069 A1 | 2/2017 | Nos et al. | |
| 2020/0007930 A1 | 1/2020 | Katsavounidis et al. | |

FOREIGN PATENT DOCUMENTS

| | | |
|---|---|---|
| CA | 3064557 A1 | 12/2018 |
| CN | 102088395 A | 6/2011 |
| CN | 102883152 A | 1/2013 |
| CN | 105165096 A | 12/2015 |
| CN | 105933624 A | 9/2016 |
| CN | 107211193 A | 9/2017 |
| CN | 110679153 A | 1/2020 |
| JP | 2002-359833 A | 12/2002 |
| JP | 2004-153789 A | 12/2005 |
| JP | 2020-522193 A | 7/2020 |
| KR | 10-2020-0013658 A | 2/2020 |
| MX | 2019014297 A | 1/2020 |
| WO | 2018/222435 A1 | 12/2018 |

OTHER PUBLICATIONS

Notice of Allowance received for U.S. Appl. No. 15/610,053 dated May 20, 2019, 18 pages.
Non-Final Office Action received for U.S. Appl. No. 16/536,298 dated Jun. 17, 2020, 7 pages.
Final Office Action received for U.S. Appl. No. 16/536,298 dated Nov. 13, 2020, 10 pages.
International Search Report and Written Opinion received for PCT Application Serial No. PCT/US2018/033729 dated Oct. 24, 2018, 10 pages.
International Preliminary Report on Patentability received for PCT Application Serial No. PCT/US2018/033729 dated Dec. 12, 2019, 9 pages.
First Office Action received for Canada Patent Application Serial No. 3,064,557 dated Jan. 13, 2021, 4 pages.
Notice of Allowance received for U.S. Appl. No. 17/243,389 dated Mar. 11, 2022, 8 pages.
Communication pursuant to Article 94(3) EPC received for EP Patent Application Serial No. 18769838.6 dated Nov. 13, 2020, 07 pages.
First Office Action received for Chinese Patent Application Serial No. 201880035639.X dated Jun. 17, 2021, 24 pages. (Including English Translation).
Communication Pursuant to Article 94(3) EPC received for EP Patent Application Serial No. 18769838.6 dated Jun. 14, 2021, 6 pages.
Notice of Allowance received for U.S. Appl. No. 16/536,298 dated Feb. 3, 2021, 8 pages.
Office Action received for Japanese Patent Application Serial No. 2019-566151 dated Mar. 29, 2022, 16 pages. (Including English Translation).
Notice of Decision to Grant a Patent received for Japanese Patent Application Serial No. 2019-566151 dated Sep. 13, 2022, 5 pages. (Including English Translation).
Second Office Action received for Chinese Patent Application Serial No. 201880035639.X dated Dec. 23, 2021, 24 pages. (Including English Translation).
Decision to Grant received for Chinese Patent Application Serial No. 201880035639.X dated Mar. 10, 2022, 3 pages. (Including English Translation).
Examination Report received for Indian Patent Application Serial No. 201947046322 dated Feb. 3, 2022, 7 pages.
Office Action received for Korean Patent Application Serial No. 10-2019-7034871 dated May 19, 2022, 18 pages. (Including English Translation).
Notice of Allowance dated Jul. 10, 2023 for Netflix MX Application No. MX/a/2019/014297.

* cited by examiner

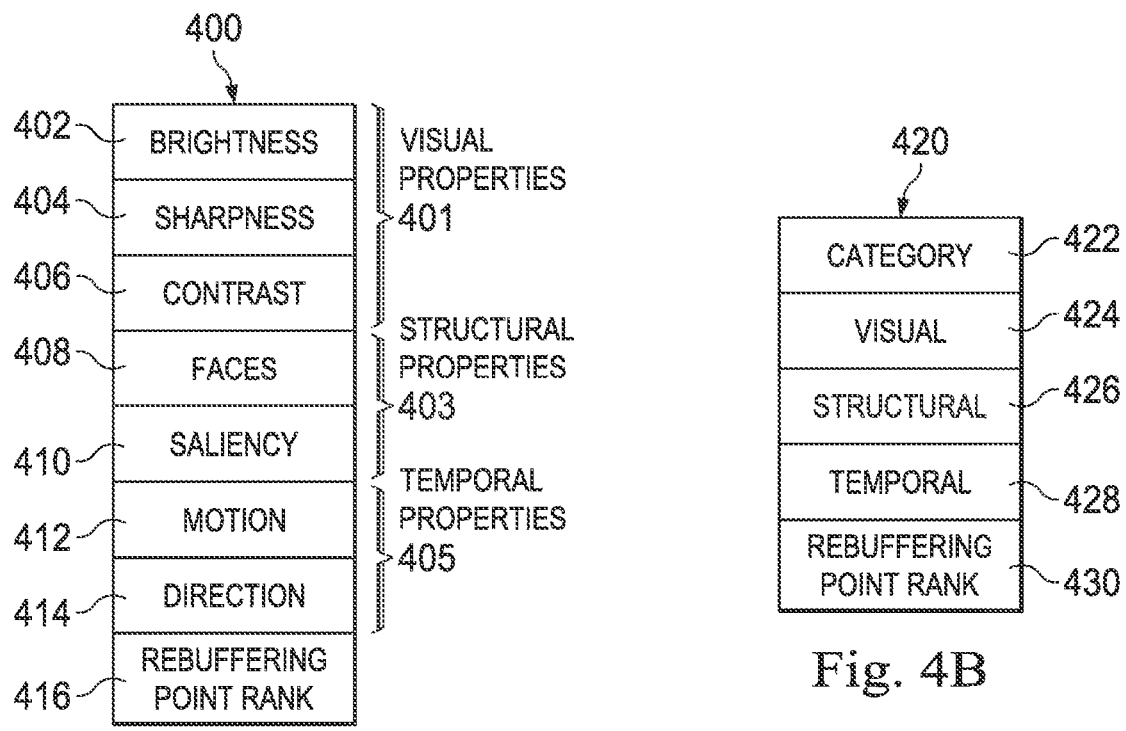
Fig. 4A
Fig. 4B
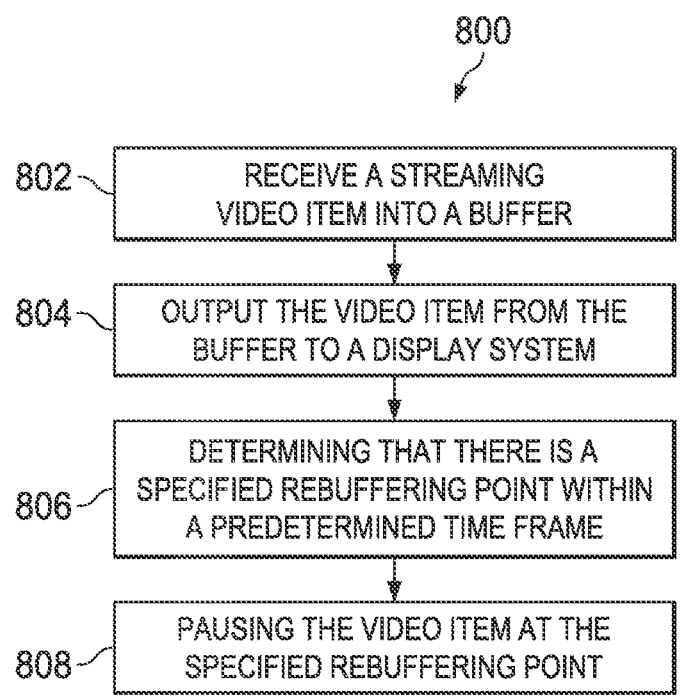
Fig. 8

TEMPORAL PLACEMENT OF A REBUFFERING EVENT

CROSS REFERENCE TO RELATED APPLICATION

This application is a continuation of U.S. application Ser. No. 17/243,389, filed 28 Apr. 2021, which is a continuation of U.S. application Ser. No. 16/536,298, filed 8 Aug. 2019, which is a continuation of U.S. application Ser. No. 15/610,053, filed 31 May 2017, the disclosures of which are incorporated, in their entirety, by this reference.

TECHNICAL FIELD

The present disclosure relates generally to video streaming, and more particularly, to the timing of a rebuffering event within a video stream.

BACKGROUND

While consumers may access media items, such as movies and television shows, by receiving over the air signals or by subscribing to a cable or satellite television provider, increasingly consumers are accessing content over Internet-based systems. Some Internet-based systems allow users to download or stream content over the Internet to a variety of client devices. For example, an Internet-based media system may provide content to users via a personal computer, a set-top box, or a personal mobile device, such as a smart phone or tablet computer. In particular, streaming media systems enable users to access media content in a streaming video format, such that the users may begin consuming (e.g., watching and/or listening to) content before the entirety of the content is delivered to a given user's client device. Such a system allows users to access content while avoiding a potentially lengthy download process before beginning to consume their selected content.

When streaming a media item, the user does not have to download the entire media item before being able to view the media item. Instead, the user can start consuming the media item almost immediately as soon as the data representing the media is delivered to the user's device. As the data representing the media item is delivered to the user's device, it is temporarily placed in a buffer. The buffer allows for a smoother viewing experience because if the network connection between the user's device and the server from which data is being streamed is temporarily disrupted or slowed, consumption of the media item may continue using data in the buffer. Ideally, the rate at which data is delivered to the buffer is greater than the rate at which data is read out of the buffer for display on the client device. However, in some cases, the data is read out of the buffer faster than it is delivered to the buffer. In the event that the buffer utilization (i.e., the amount of data currently within the buffer) falls to zero, then the media stream is typically paused until sufficient data can be delivered to the buffer. This can lower the quality of experience for a viewer, since this abrupt stopping of playback is perceived by the viewer as a frozen screen—sometimes overlaid with an hour-glass or spinning-wheel icon and a corresponding absence of audio, i.e. silence. The user will generally have no awareness of the amount of data in the buffer, and thus the user perceives the stopping of playback as a randomly-timed event. When sufficient data is again received into the buffer, playback of the media item may abruptly resume. The resulting discontinuous playback of the media item is not enjoyable for the user.

BRIEF DESCRIPTION OF THE DRAWINGS

FIGS. 4A and 4B are tables showing various metadata that may be assigned to portions of a video item to help identify specified rebuffering points, according to some embodiments of the present disclosure.

FIG. 8 is a flowchart showing an illustrative method for pausing a video item at a specified rebuffering point, according to some embodiments of the present disclosure.

Figure 1:
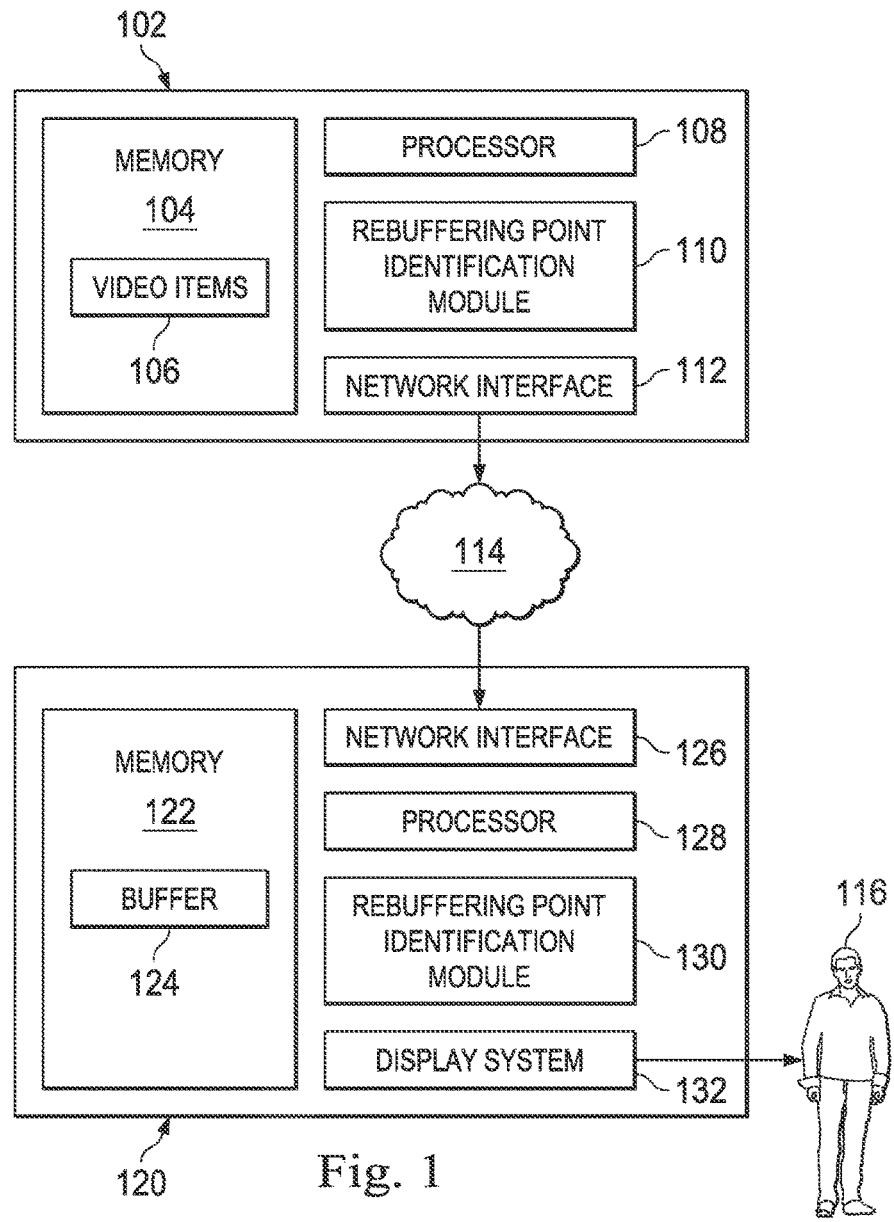
FIG. 1 is a diagram showing an illustrative server computing system and a client computing system that may be used to perform optimal placement of a rebuffering event, according to some embodiments of the present disclosure.

These drawings will be better understood by those of ordinary skill in the art by reference to the following detailed description.

DETAILED DESCRIPTION

With reference to the drawings briefly described above, exemplary applications of systems and methods according to the present disclosure are described in this section. These examples are provided to add context and aid in the understanding of the invention. It will thus be apparent to one skilled in the art that the present invention may be practiced without some or all of these specific details. In other instances, well-known process steps or operations have not been described in detail in order to avoid unnecessarily obscuring the present disclosure. Additionally, other applications of the concepts and principles described herein are possible, such that the following examples should not be taken as limiting. The principles and concepts described herein may be applied to select an optimized time for a rebuffering event that may decrease at least some of the negative aspects of rebuffering for viewers of streamed media items.

In the following detailed description, references are made to the accompanying drawings, which form a part of the description and in which are shown, by way of illustration, specific embodiments of the present disclosure. Although these embodiments are described in sufficient detail to enable one skilled in the art to practice the invention, it is understood that these examples are not limiting, such that other embodiments may be used, and changes may be made without departing from the spirit and scope of the invention.

As described above, in conventional streaming implementations, if data is not delivered to the client device fast enough, the video must be paused to wait for more data.

After a sufficient amount of data has been received, the video can resume. Various factors, such as network conditions, may affect the ability of the client device to receive data fast enough. Because there is often little, if any, control over network conditions, such pauses may appear as random to the user, often interrupting important story elements. These interruptions are typically perceived as a frozen screen with no audio. The user may also be presented with an indication of delay, such as a "Buffering" message, a spinning wheel, or an hourglass icon. These pauses, which allow the buffer to fill up with additional data, will be referred to as rebuffering events.

Rebuffering events are frustrating to a viewer because they interrupt the viewing experience. Rebuffering may be even more undesirable when the video is paused in the middle of an important scene or important dialogue. Accordingly, the present disclosure relates to methods and systems that optimize the placement of pauses for necessary rebuffering events so as to avoid a pause in the video stream at an undesirable time. In other words, if rebuffering events must occur, then the rebuffering points may be set to occur at times that are less inconvenient for the user instead of at random.

In one example, the locations for rebuffering points may be identified within a particular piece of content such as a video item. These identified locations will be referred to as specified rebuffering points. The specified rebuffering points may correspond to moments or times within the video item that are less inconvenient for rebuffering. For example, the specified rebuffering points may correspond to scene changes, shot changes, or pauses in dialogue. In one example, if buffer utilization gets too low, then the video item may be paused at one of the specified rebuffering points, even if the buffer utilization is not yet below the point at which a rebuffering event would otherwise be triggered. In other words, the video stream may be paused for rebuffering before such a pause for rebuffering would occur in a conventional implementation of video streaming where rebuffering occurs upon buffer depletion. Additionally, in some examples, if the network connection from a streaming server to a client system is such that the rate at which data is delivered to the buffer is less than the rate at which data is consumed, then the video item may be briefly paused at certain specified rebuffering points instead of at apparently random points within the video due to depletion of data within the buffer.

FIG. 1 is a diagram showing an illustrative server computing system 102 and a client computing system 120 that may be used to perform optimal placement of a rebuffering event. The server computing system 102 may be one of many servers that are owned, operated, or otherwise managed by a streaming media service. The server computing system 102 includes a processor 108, a memory 104, a rebuffering point identification module 110, and a network interface 112. The server computing system 102 may further include, for example, stand-alone and enterprise-class servers operating a server operating system (OS) such as a MICROSOFT® OS, a UNIX® OS, a LINUX® OS, or another suitable server-based operating system 102. The server computing system 102 may be a server in a content-distribution network. It should be appreciated that the server computing system 102 illustrated in FIG. 1 may be deployed in other ways and that the operations performed and/or the services provided by such servers may be combined or separated for a given implementation and may be performed by a greater number or fewer number of individual server devices.

The processor 108 may include one or more individual processors or processing cores. Similarly, the memory 104 may include one or more memory devices of different types. The memory 104 may store machine-readable instructions for execution on the processor 108. Such instructions may be associated with various applications as well as an operating system. Additionally, the memory 104 may store video items 106 for streaming. Such video items 106 may include, for example, full-length movies, episodes of a series, or portions of a movie or episode. Other types of video items are also contemplated. The video items 106 may be encoded in a machine-readable format that is suited for storage and/or streaming. More specifically, the video items 106 may include a set of data that specifies a series of frames, each frame including an image or information that can be processed to obtain an image. When the frames are displayed in sequence, they produce a video. The video items 106 may be encoded using various technologies that compress the data. The data that comprises the video items 106 may also include audio data corresponding to the video data.

As noted, the memory 104 may include a plurality of memory modules. The memory modules may be of varying types. Some of the memory 104 may be volatile memory such as Random Access Memory (RAM). Some of the memory 104 may be non-volatile memory such as hard disk drives or Solid State Drives (SSDs). In addition to storing machine-readable instructions that form applications, the memory 104 may store video items 106 for analysis and for streaming. The memory 104 may also store the results of such analysis, such as the locations or times within the video items 106 corresponding to specified rebuffering points.

The server computing system 102 includes a network interface 112 that allows the server computing system 102 to communicate with other computing systems over a network 114 such as the Internet. The network interface 112 includes the hardware, software, or combination of both to encode data for transmission over the network 114. The network interface 112 may utilize a variety of communication technologies such as Ethernet, fiber optic, and wireless communication technologies.

In some examples, a server computing system 102 that stores the video items 106 may perform the analysis of the video items 106 to identify rebuffering points. In such examples, the server computing system 102 may include a rebuffering point identification module 110. The rebuffering point identification module 110 includes the hardware, software, or combination of both that analyzes the data representing the video items 106 and identifies the placement of rebuffering points. The identified rebuffering points may be represented in a variety of ways. In one example, the identified rebuffering points may be represented as points in time (e.g., a timestamp including minutes, seconds, and fractions of a second) within the video items 106. In some examples, the frames corresponding to the rebuffering points may be tagged with metadata that indicates that such frames correspond to rebuffering points. The placement of the identified rebuffering points may be transmitted to the client computing system 120 at the outset of streaming, such as in a manifest file or in a metadata file pointed to in the manifest file, or during the streaming process. The manifest file may also point to the location of one or more streams available to a user for the same audiovisual content, the streams having different bit rates and/or qualities. A client computing system 120 with a high quality connection over the network 114 to the server computing system 102 may select a high quality stream from among a plurality of streams identified in the manifest file. A client computing system 120 with a low quality (e.g., low bandwidth) connection may select a low quality stream. In the event that the quality of the connection over the network 114 changes, the client computing system 120 may begin accessing a different stream as appropriate to provide the user with an optimal experience. The placement of rebuffering points may be indicated in data contained in the streams, such as in individual frames, or in a separate file. For example, rebuffering points may be included in Supplemental Enhancement Information (SEI) messages such as are included by H.264 codecs or other comparable methods of transmitting supplemental information, like captioning or descriptive text, in a data stream.

In some examples, the rebuffering point identification module 110 identifies rebuffering points within a video item 106 before that video item 106 is streamed. For example, if the video item 106 is only being stored and not currently being streamed, then the rebuffering point identification module 110 may use that time to perform an analysis of the video item 106 to determine the rebuffering points. In some embodiments, the analysis may be performed when the video item 106 is being encoded from a format optimized for high-fidelity storage to a compressed format suitable for streaming video. In some examples, the rebuffering points may be identified before the video item 106 is uploaded to the server computing system 102. In some examples, the rebuffering points may be identified by a separate server (not shown) positioned within the network 114 between the server computing system 102 that stores the video item 106 and the client computing system 120 that consumes the video item 106.

The streaming process involves transferring data representing a selected one of the video items 106 from the server computing system 102 to a client computing system 120 through a network 114 such as the Internet. In the present example, the client computing system 120 includes a processor 128, a memory 122, a network interface 126, a rebuffering point identification module 130, and a display system 132. In some examples, the client computing system 120 may be, for example, a desktop, laptop, video console, or tablet computing device.

Like the memory 104 of the server 102, the memory 122 of the client computing system 120 may include one or more memory devices of different types. The memory 104 may store machine-readable instructions for execution on the processor 128. Such instructions may be associated with various applications as well as an operating system. Additionally, the memory 122 may include a buffer 124. The buffer 124 is a portion of memory used to temporarily store data that is received over the network 114 before the data is processed for display to a user 116 via the display system 132. The rate at which data is consumed may depend on the resolution and/or bitrate of the current stream. For example, if the resolution or bit rate of the stream is relatively high, then more data is used to produce the video. Thus, more data is consumed within a particular period of time in order to present the video item to the user 116. Conversely, if the resolution or bitrate of the stream is relatively low, then less data is used to produce the video. Thus, less data is consumed within a particular period of time in order to present the video to the user 116. Accordingly, the size of the buffer 124 may be set or adapted based on the bit rate of the video item stream selected.

In some examples, the client computing system 120 may be responsible for the identification of rebuffering points within a video item 106. In such cases, the client computing system 120 includes a rebuffering point identification module 130. In some examples, the rebuffering point identification module 130 may be configured to analyze the content 106 as it is received in order to identify rebuffering points. In other words, rebuffering points are identified in situ on the client computing system 120. This may eliminate the need for analysis and metadata generation associated with rebuffering point identification by the server computing system 102.

Like the network interface 112 of the server system 102, the network interface 126 of the client computing system 120 includes the hardware, software, or combination of both to encode and decode data for communications over the network 114. This data is received from the server system 102 over the network 114 through the network interface 126, and the data is placed within the buffer 124.

The display system 132 includes the components used to present video items to the user 116. For example, the display system 132 may include video and audio processing hardware and software. The display system 132 may also include a video output device such as a monitor or screen. The display system 132 may also include audio output devices such as speakers or headphones or connections configured to communicate with audio output devices.

Figure 2:
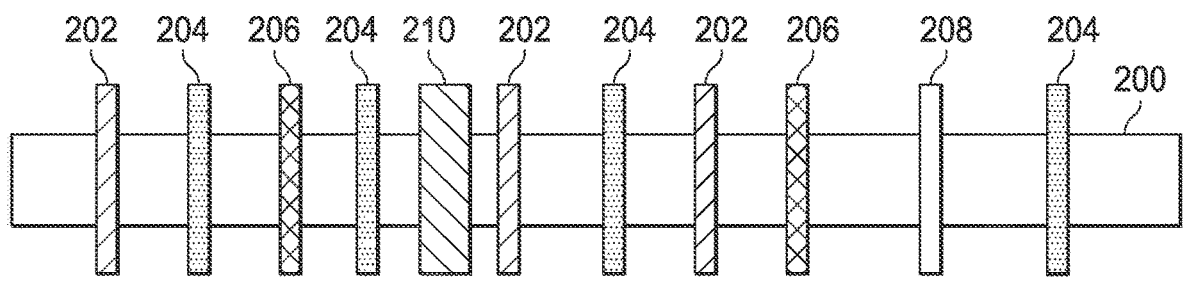
FIG. 2 is a diagram showing specified rebuffering points within a video item, according to some embodiments of the present disclosure.

FIG. 2 is a diagram showing specified rebuffering points 202, 204, 206, 208. According to the present example, a video item 200 includes rebuffering points 202 corresponding to scene changes, rebuffering points 204 corresponding to shot changes, rebuffering points 206 corresponding to dialogue pauses, and rebuffering points 208 corresponding to images having certain visual characteristics, such as low brightness. Other criteria may be used to predetermine suitable locations for rebuffering events.

In some examples, the rebuffering point identification module 110, 130 may analyze the data representing the video item 200 and identify each scene change. A scene generally refers to a section of a film involving a particular action at a single location and covering a continuous period of time. The rebuffering point identification module 110, 130 may detect scene changes through a variety of different means. In one example, the data representing the colors within the image may be analyzed to determine that an overall color appearance changes from one frame to the next. For example, an outdoor scene may have a variety of colors within the image while a scene change to an indoor scene may have a different variety of colors. Additionally, the data representing the audio portion may be analyzed to determine that the audio ambience of the video has changed, thus suggesting a scene change. For example, a scene in which a character is driving a car may include the sounds of the car and traffic. The scene may then change to a scene in a quiet room in which characters are talking to each other. Such change in audio ambience may help identify a scene change. Because scene changes typically present a natural shift in the story, they may be less inconvenient for a rebuffering event. Thus, the frames corresponding to scene changes may be identified as rebuffering points 202.

In some examples, the rebuffering point identification module 110, 130 may analyze the data representing the video item 200 and identify each shot change as described further herein. A shot may generally represent a portion of the video that includes one continuous camera roll. A shot may also generally represent continuous footage between two edits or cuts. The rebuffering point identification module 110, 130 may detect shots in a variety of ways. In one example, the features within each frame are analyzed. Such features may include the coloring of the frame or the brightness of the frame. Additionally, image processing algorithms may identify features such as shapes, edges, and corners to be able to track these features across multiple frames. If a particular frame is substantially different than the previous frame, then it may be determined that a cut has occurred. In other words, the previous shot has ended and a new shot has started. Sometimes, shot changes occur during the middle of dialogue or in the middle of another continuing sound source, such as a jet passing by. In some cases, shot changes do not occur during the middle of the dialogue. Thus, a distinction may be made between shot changes that occur during dialogue or during a continuing sound source and shot changes that occur between dialogues or without continuing sound sources. A rebuffering event at a shot change that occurs between dialogues or continuing sound sources may be perceived by the user 116 as less inconvenient. Accordingly, the frames corresponding to such shot changes may be identified as rebuffering points 204.

In some examples, the rebuffering point identification module 110, 130 may analyze the audio data within the within the video item 200 and identify pauses in dialogue. Dialogue may be detected by the detection of audio transients. Various functions can be used to analyze the data and determine when characters are speaking and when they are not. In some examples, if the length of a pause in the middle of a dialogue is above a predefined threshold, then some point of time within that pause may be identified as a rebuffering point 206.

In some examples, the rebuffering point identification module 110, 130 may analyze the data representing the video item 200 for points at which the visual properties have specified characteristics such as low brightness or relative low brightness. For example, a visually darker portion of the video item may be defined as any point within the video item 200 at which the overall brightness of the image is below an absolute threshold value or if the brightness of the image below a threshold value based on the preceding image or frame. During such portions, there may be fewer distinctive features within the video that are of a particular interest to a viewer. Thus, such visually darker portions may be less inconvenient for a rebuffering event. Accordingly, such portions may be identified as rebuffering points 208.

In some examples, instead of a single point in time, a single timestamp, or a single frame, within the video item 200 being identified as a rebuffering point, a rebuffering time range 210 may be identified. For example, it may be determined that a particular time range 210 corresponds to a pause in dialogue, or visually darker portion of the video item 200. In such cases, any period of time within that time range 210 may be considered less inconvenient for a rebuffering event.

In some examples, certain types of rebuffering points may be preferred over others. For example, if possible, it may be more preferable to pause for a rebuffering event during a scene change than during a shot change. Similarly, it may be more preferable to pause for a rebuffering event during a scene change than during a pause in dialogue. Thus, the rebuffering points may be assigned a ranking value. The logic that determines when the rebuffering point should be used for a rebuffering event may take into account the ranking value of the immediate rebuffering point. For example, if the need for a rebuffering event is more immediate, then lower ranked rebuffering points such as those corresponding to visually darker portions or pauses in dialogue may be used for rebuffering events. If, however, the need for a rebuffering event is less immediate, then only higher ranked rebuffering points, such as a scene change, may be used for a rebuffering event. In some embodiments, a rebuffering event may occur by default at certain rebuffering points, such as at a dark scene change, i.e. where a scene goes black or fades to black, accompanied by silence in audio data. The rebuffering may be performed unless the amount of data in the buffer exceeds a certain threshold, such as ten seconds, thirty seconds, or a minute. In such instances, the rebuffering may be performed for a short amount of time. For example, the rebuffering may be performed for less than a second or less than half a second. Including such pauses when the user 116 is unlikely to perceive the pause may enable the buffer to be expanded in anticipation of any drops in network connectivity, such as when switching between cell towers.

Use of the rebuffering points may vary depending on a variety of conditions associated with the client computing system 120 receiving the video stream. For example, various network conditions may affect use of the rebuffering points. If the network connection between the streaming service provider and the client computing system 120 is slower than the ideal rate for streaming at a particular resolution, then the client computing system 120 may be configured to pause at particular rebuffering points in order to keep the buffer utilization above the desired threshold. For example, the client computing system 120 may pause for a few seconds or for less than a second at each scene change in order to ensure that the buffer utilization does not drop below the desired threshold. In some examples, if the rate at which content can be delivered over the network to the client computing system 120 is lower, then the client computing system may pause at lower ranked rebuffering points such as pauses in dialogue as well.

In some examples, the length of each pause may depend upon the current rate at which data for the video item 200 is being delivered to the client computing system 120. In general, a lower rate may be handled by pausing for longer periods of time at the rebuffering points. Conversely, a higher rate may be handled by pausing for shorter periods of time at the rebuffering points. The length of such pauses may be adjusted dynamically as network conditions change during the streaming process. For example, if network conditions improve, the length of such pauses may be shortened. In some examples, if network conditions improve substantially, it may be determined that no pauses are needed to keep buffer utilization above the desired threshold. Conversely, if network conditions degrade, then longer pauses may be applied at the rebuffering points. Accordingly, a current rate of rebuffering may be utilized in determining the lengths of time used to rebuffering as well as the types of rebuffering points that are used for rebuffering.

The length of the pauses for rebuffering events may also vary depending on the ranking or type of a particular rebuffering point. For example, a higher ranked rebuffering point such as one corresponding with a scene change may have longer pauses as such points are less intrusive to the viewing experience. Conversely, lower ranked rebuffering points such as gaps in dialogue may have shorter pauses as such points may be slightly more intrusive to the viewing experience. For example, given particular conditions, a pause of one second may be used during a scene change while a pause of less than 500 milliseconds may be used during a gap in dialogue.

FIGS. 3A-D are diagrams showing use of the specified rebuffering points 306 for rebuffering events, according to some embodiments of the present disclosure. In some examples, pausing for rebuffering events may be triggered when the buffer utilization 310 falls below a predefined threshold 308. Buffer utilization 310 may be defined in a variety of ways. In one example, buffer utilization 310 may be defined by the amount of data within the buffer that is currently unconsumed. In some examples, buffer utilization 310 may be defined by the amount of playing time for the video item within the buffer. For example, it may be the case that the buffer has enough data for one minute and 32 seconds of play time.

FIGS. 3A-D illustrate a timeline for a video item 200. Line 302 represents the point in time within the video item 200 that is currently being displayed for viewing. Line 304 represents the point in time within the video item 200 at which the buffer would be consumed assuming no new data is received. In other words, if no more data were to be delivered to the buffer, the video item could continue playing until the point represented by line 304. Thus, the range in time between line 302 and line 304 represents the buffer utilization 310.

Figure 3A:
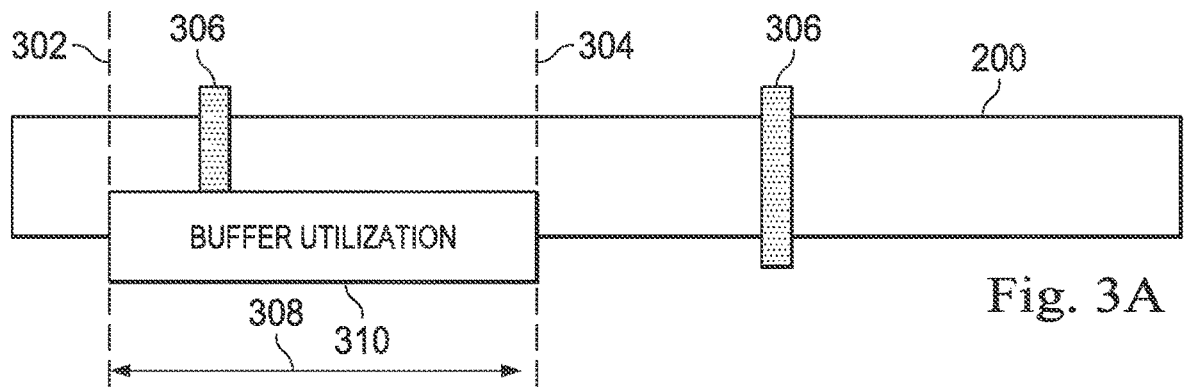
FIGS. 3A, 3B, 3C, and 3D are diagrams showing use of the specified rebuffering points for specified rebuffering events, according to some embodiments of the present disclosure.
Figure 3B:
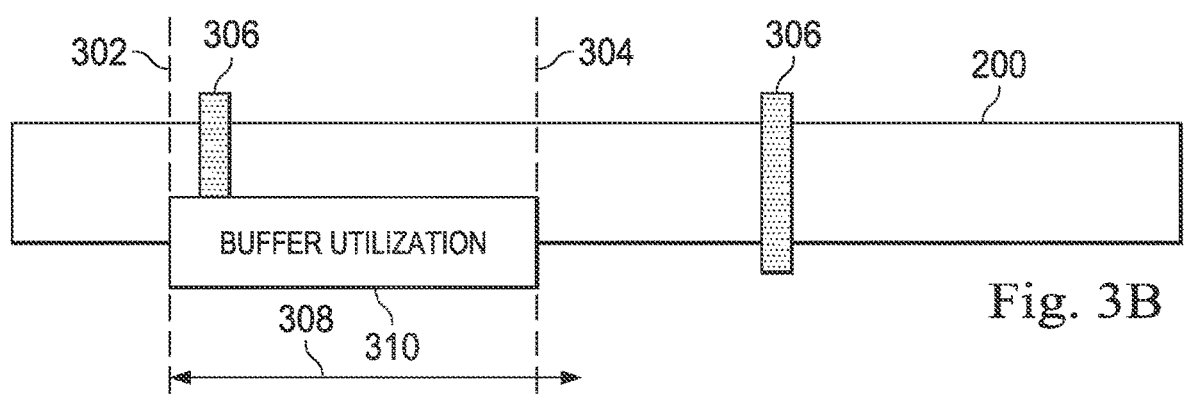

FIG. 3A shows that the current buffer utilization 310 is above a predefined threshold. Thus, presentation of the video item will operate as normal. In FIG. 3B, as the video item is played, the buffer utilization 310 falls below the predefined threshold 308. This may happen because the rate at which data is delivered to the buffer is less than the rate at which the data is processed for presentation in the display system 132. Accordingly, it may be determined that the buffer utilization 310 is projected to fall to a point at which a rebuffering event is needed. Conventional streaming systems may simply pause at whichever point it is determined that rebuffering event is needed or at the point that all data in the buffer has been processed. However, according to principles disclosed herein, a predetermined or pre-identified rebuffering point may be used as the point at which the rebuffering event occurs. Because the rebuffering point corresponds to a point in the video item 200 that is less intrusive, the user 116 may have better experience.

Figure 3C:
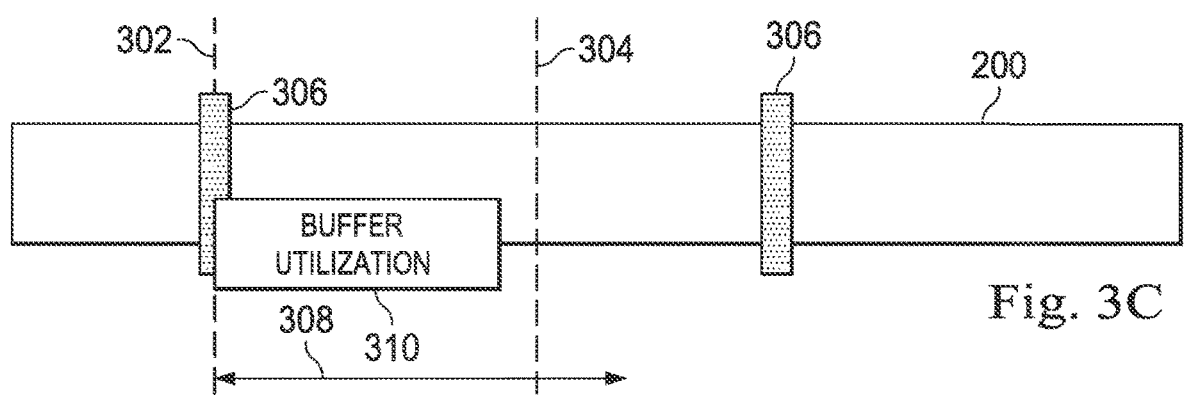
Figure 3D:
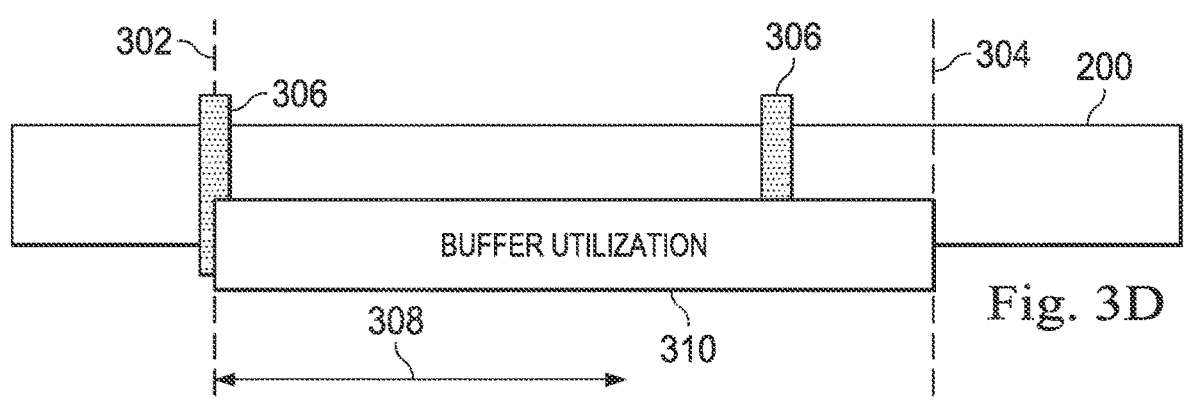

FIG. 3C shows that line 302 has reached the rebuffering point 306. At this rebuffering point, the video item 200 may be paused to allow for rebuffering. The presentation of the video item 200 in the display system 132 may be stopped temporarily. FIG. 3D illustrates a point in time after the video item 200 has been paused and before it resumes. As illustrated, the additional time provided by the pause allows more data to be added to the buffer, thus expanding the buffer utilization 310 to a point well above the predefined threshold 308. In some examples, the pause for rebuffering at the rebuffering point 306 may be for a period of time required to allow the buffer utilization to reach a predetermined size before resuming. In some embodiments, the duration of the pause for rebuffering may be determined by subsequent rebuffering points. For example, the video item 200 may be paused for rebuffering until another rebuffering point or another rebuffering point of a certain type is present in the buffered data. Or a certain amount of time or data may be added after the subsequent rebuffering as a rebuffering pad. For example, a pause for rebuffering may last until the data associated with the second depicted rebuffering point 306 has been added to the buffer or until a threshold amount of additional data after the data associated with the second depicted rebuffering point 306 has been added.

In some examples, the client system that is displaying the video may evaluate the current utilization of the buffer at each specified rebuffering point. If, at a particular specified rebuffering point, the buffer utilization is below a particular threshold, then the video item may be paused at that particular specified rebuffering point. Additionally, the current utilization of the buffer may help determine how long the video item should be paused at that particular rebuffering point. For example, if the current buffer utilization is close to the threshold, then the pause may be relatively short. However, if the current buffer utilization is far below the threshold, then the pause may be relatively long. In the event that the buffer utilization is above the threshold, then there may be no need to pause the video item at that rebuffering point.

FIGS. 4A and 4B are tables showing metadata that may be assigned to shots and frames within a piece of content to help identify rebuffering points. In some examples, the rebuffering point identification module 110, 130 may include the hardware, software, or combination of both to analyze the data of a video item 200 and identify different shots and frames within the video item 200. For example, the rebuffering point identification module 110, 130 may indicate the starting point and stopping point for each different shot within the video item 200 or for each different shot within a currently buffered portion of the video item 200, depending on the implementation. The rebuffering point identification module 110, 130 may also identify a selection of frames within the video item 200. The rebuffering point identification module 110, 130 may also analyze the images associated with each of the frames to detect various features within the frames. Such features may include, for example the face of characters appearing in the shot or frame. Based on such features, the rebuffering point identification module 110, 130 may assign metadata to the various shots and images detected within the video item 200. Such metadata may then be used to assign rebuffering points within the video item 200 as well as ranking values to those rebuffering points. For example, a pause for rebuffering may be preferable during a time when a first actor is displayed rather than a second actor.

A frame corresponds to a still image that when combined with other frames in sequence produces a motion picture. The data that forms the video item 200 may describe each frame within the video item 200. The rebuffering point identification module 110, 130 may analyze a plurality of frames within the video item 200 and assign metadata to each of those frames based on features detected within those frames. A series of frames may form a shot. A shot may generally represent a portion of the video that includes one continuous camera roll. A shot may also generally represent continuous footage between two edits or cuts. The rebuffering point identification module 110, 130 may detect shots in a variety of ways. In one example, the features within each frame are analyzed using image processing algorithms. Such features may include the coloring of the frame, the brightness of the frame, or machine-identifiable features such as shapes and edges. If a particular frame is substantially different than the previous frame, then it may be determined that a cut has occurred. In other words, the previous shot has ended and a new shot has started. After various shots have been identified, the rebuffering point identification module 110, 130 may identify differences between the features of different frames within the shots. These differences may be used to categorize the shot and assign various metadata to the shot.

The rebuffering point identification module 110, 130 also analyzes each shot in order to assign metadata, including a shot category, to that shot. This may be done by analyzing the machine-readable data that represents frames within the shot. In one example, the rebuffering point identification module 110, 130 selects at least two frames within a particular shot. The rebuffering point identification module 110, 130 analyzes the features found within those frames and identifies the differences between the features of those frames. If, for example, the spatial relationships between various features of one frame are larger than the spatial relationships between various features of the other frame, it may be determined that the shot is a zoom-out shot. If, for example, the features of one frame are determined to be those of a character's face, and the features of the other frame are also determined to be those of the character's face, it may be determined that the shot is a close-up shot if the face occupies more than a threshold amount of the frame. If, for example, it is determined that the features of one frame have shifted with respect to the features in the other frame in a particular manner, it may be determined that the shot is an establishing shot. Other types of shots are contemplated as well. In some examples, the type of shot in which a rebuffering point exists may affect the ranking value of that rebuffering point. For example, it may be less inconvenient to pause during an establishing shot than a close-up shot.

The rebuffering point identification module 110, 130 may also analyze a select number of frames within the video item 200. Analyzing the frames within the video item 200 may involve examining the machine-readable data that represents the video item 200. In some examples, every single frame of the video item may be analyzed. In some examples, however, every X number of frames may be analyzed. In some examples, X may be within a range of about 5 to 60. Other values for X are contemplated as well. The rebuffering point identification module 110, 130 may also assign metadata to each frame analyzed.

FIG. 4A shows an illustrative table 400 that includes metadata for a particular frame, also referred to as frame metadata. The metadata may indicate the visual properties 401 of the frame, the structural properties 403 of the frame, and the temporal properties 405 of the frame. The visual properties 401 include brightness 402, sharpness 404, and contrast 406. Other visual properties may include the color composition of the frame or color temperature. The structural properties 403 include frame faces 408 and frame saliency 410. The temporal properties 405 include frame motion 412 and frame direction 414.

The rebuffering point identification module 110, 130 may assign a brightness value 402 to a frame based on the average brightness value associated with each pixel within the frame. Specifically, the rebuffering point identification module 110, 130 may examine the data that represents the frame. That data may define color values for each pixel within the frame. For example, if the data for the pixel is represented in the YUV—also known as YCbCr—color scape, the Y value is representative of the pixel luminance. For example, if the data for the pixel is represented in the RGB color space, then the brightness for a particular pixel may be defined as the average color value for the pixel (e.g., Br=(R+G+B)/3, where Br is the brightness, R is the red color value, G is the green color value, and B is the blue color value). Other manners for determining a brightness value are contemplated.

The rebuffering point identification module 110, 130 may assign a sharpness value 404 and a contrast value 406 to the frame based on an analysis of the data that defines the frame. For example, the rebuffering point identification module 110, 130 may apply a function to determine a sharpness value and a contrast value of the frame. Sharpness, sometimes referred to as acutance, is a measure of how strongly the contrast of an image is perceived. Contrast refers to the color differences within the image. Various methods for determining a sharpness value and a contrast value based on the data that represents the frame may be used.

The rebuffering point identification module 110, 130 may also identify faces 408 that appear within the shot. For example, it may be determined based on an analysis of features within the frame that the frame includes one or more faces. Various facial recognition functions may be applied to identify the presence of the faces and then identify the actual faces represented in the data. As an example, the Viola-Jones algorithm is one popular choice to detect faces. The faces of the various characters within the frame may also be assigned a popularity value. This popularity value may be derived in a variety of manners. In one example, the popularity value is based on a percentage of time in which that character appears within the video item. In some examples, external sources may be used to determine the popularity of the character. For example, a popularity value may be predefined by a human user. In some examples, an analysis of publicly available information such as webpages and social media may be applied in order to assign a popularity value to a particular character. The popularity of the characters within a particular shot or scene may also affect the ranking value of rebuffering points within that shot or scene. For example, pausing for rebuffering while showing a more popular character or actor may be preferable.

The rebuffering point identification module 110, 130 may assign saliency data to a frame. The saliency data may include, for example, a saliency map. A saliency map identifies the uniqueness of portions of an image. For example, the color uniqueness of a portion (e.g., pixel or set of adjacent pixels) of an image may be identified with a value. A saliency map may also include a saliency value assigned to the person or object of focus within the image. For example, the saliency value may identify how much that person or object stands out with respect to the background in which that object or person is placed.

The rebuffering point identification module 110, 130 may also determine temporal features of the frame. For example, by analyzing the data representing the frame, and adjacent frames, it can be determined that a particular object or person of focus is moving at a particular speed and direction relative to other objects or the background of the image. This information can be determined to assign a frame motion value 412 and a frame direction value 414.

The frame motion value 412 and the frame direction value 414 may be used to determine a specified rebuffering point. For example, if there is a lot of motion within the video item at a particular frame, then this may indicate that more action is occurring during the scene. Thus, it may be more inconvenient to cause a rebuffering event at that frame. If, however, there is less motion, then it may be a less inconvenient frame for a rebuffering event. Accordingly, a frame that has a frame motion value 412 that is less than a predetermined motion value threshold may be identified as a specified rebuffering point. In some examples, a frame with a low motion value may have a ranking value that is less than a frame corresponding to a shot change or scene change.

The rebuffering point identification module 110, 130 may also determine rebuffering point ranking value 416 for the frame. The rebuffering point ranking value may be based on a variety of factors associated with the frame or the position of the frame within a shot or scene. For example, the ranking value may range from 0-100, with zero being a bad choice for a rebuffering point and 100 being the ideal choice for a rebuffering point. Thus, a frame that is positioned within dialogue and depicts an important character talking may have a rebuffering point rank value of zero and the frame corresponding to a fade out or fade in at the end or beginning of a scene may have a rebuffering point rank value closer to 100. Additionally, a frame that is positioned at the end or beginning of a shot may have a rebuffering point rank value close to 75, for example. The rebuffering point ranking value 416 may also be affected by the other properties 401, 403, 405 of the frame and other considerations as described herein. In some embodiments in which the rebuffering point identification module 110 executing on the server computing system 102 determines the properties 401, 403, and 405, the client computing system 120 utilizes this metadata to produce additional metadata including the rebuffering point ranking value 416.

FIG. 4B shows an illustrative table 420 that includes metadata for a particular shot, also referred to as shot metadata. According to the present example, the metadata includes a shot category 422, visual properties 424, structural properties 426, and temporal properties 428.

The shot category 422 identifies the type of shot. For example, shot categories may include, but are not limited to, a close-up shot, an establishing shot, a zoom-out shot, or another category of shots utilized in the television and film industries. Other types of shot categories may be defined as well. As described above, a shot category may be defined based on feature differences between at least two different frames within the shot.

The visual properties data 424 may include information such as brightness, sharpness and contrast. These may be represented as average values for the shot. For example, a sample of frames from the shot may be analyzed and averaged to determine various visual property values. The structural properties data 426 may include structural features of the shot such as which characters appear within the shot. The temporal properties data 428 may indicate the direction, if any, in which the shot is moving or in which an identified object in the shot is moving. The temporal properties data 428 may also indicate the direction any objects of focus are moving with respect to the background. Other pieces of information that may be helpful for identifying rebuffering points may be included with the shot metadata.

Figure 5:
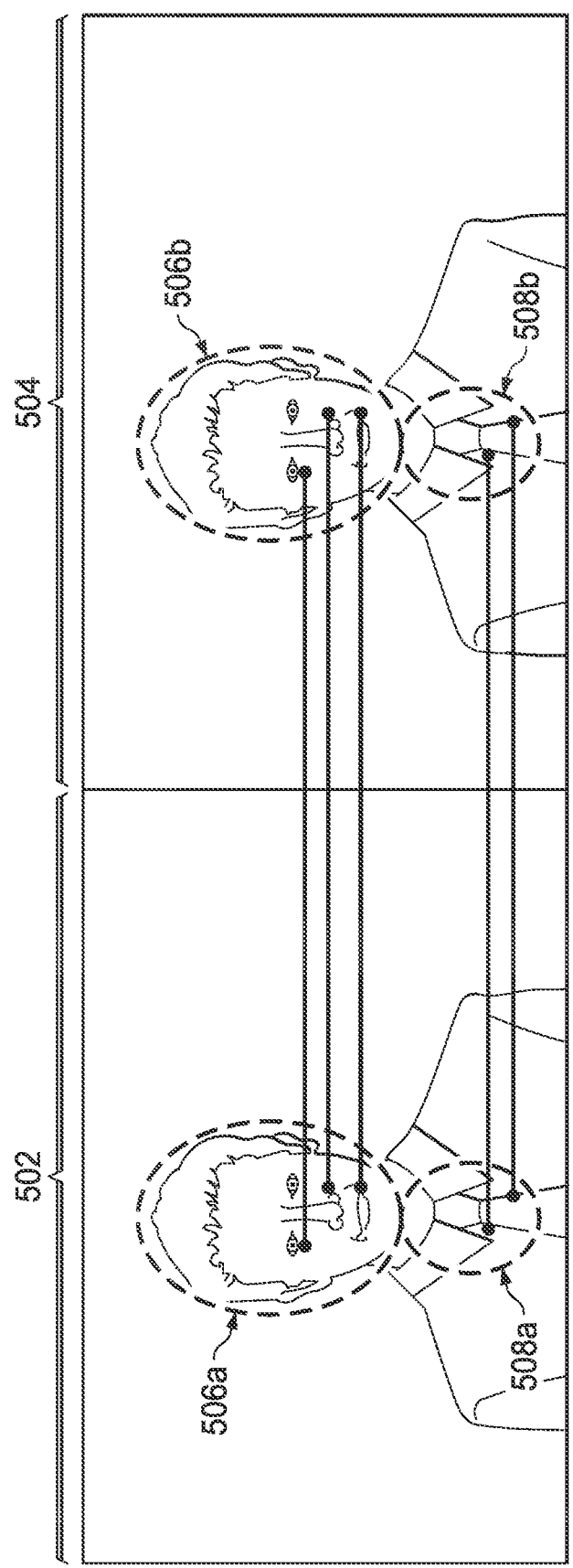
FIG. 5 is a diagram showing detection of features indicating a close-up shot in a portion of a video item, according to some embodiments of the present disclosure.

FIG. 5 is a diagram showing detection of features indicating a close-up shot. FIG. 5 illustrates an image of two different frames 502, 504. In the present example, the first frame 502 corresponds to an earlier frame within the shot and the second frame 504 corresponds to a later frame within the shot. The frames 502, 504 are analyzed to identify certain features within each frame 502, 504. In some examples, the features may be identified as primary features and secondary features. In the present example, the frames 502, 504 have a primary feature 506a, 506b which is the face of a single character appearing within the shot. Additionally, the frames 502, 504 include secondary features 508a, 508b, such as a portion of the character's clothing (in this example, the character's tie).

In some examples, various functions may be applied to identify primary features and secondary features. In general, faces of characters will be designated as primary features. Other objects that stand out with respect to the rest of the background may be designated as secondary features. If there are no faces within a shot, then other mechanisms can be used to identify a primary feature. For example, the object that stands out the most may be designated as the primary feature. Alternatively, no primary feature may be identified and only secondary features may be identified. In some examples, there may be no distinction made between primary and secondary features.

The shot category may be assigned by comparing the features between the two frames. In FIG. 5, a comparison of the primary feature 506a from the first frame 502 with the corresponding primary feature 506b from the second frame 504 shows that there is little difference in size or position of the primary feature 506. The trace lines between the features are substantially parallel and horizontal. This indicates that there is little motion between the first frame 502 and the second frame 504. Additionally, the comparison between the secondary feature 508a from the first frame 502 and the secondary feature 508b from the second frame 504 shows that there is little difference in position of the secondary feature 508. Additionally, the primary feature 506 takes up a certain amount of space within the frame. For example, the primary feature 506 may have overall dimensions that include at least one dimension that is greater than one third of the corresponding dimension of the overall frame. For example, the face identified as the primary features 506a, 506b has a height that is greater than one third of the overall height of the frame. The threshold value of one third is provided by way of example; other values or percentages may be used in other embodiments. Based on this information, it may be determined that the shot is a close-up shot. Thus, the shot may be categorized accordingly.

Figure 6:
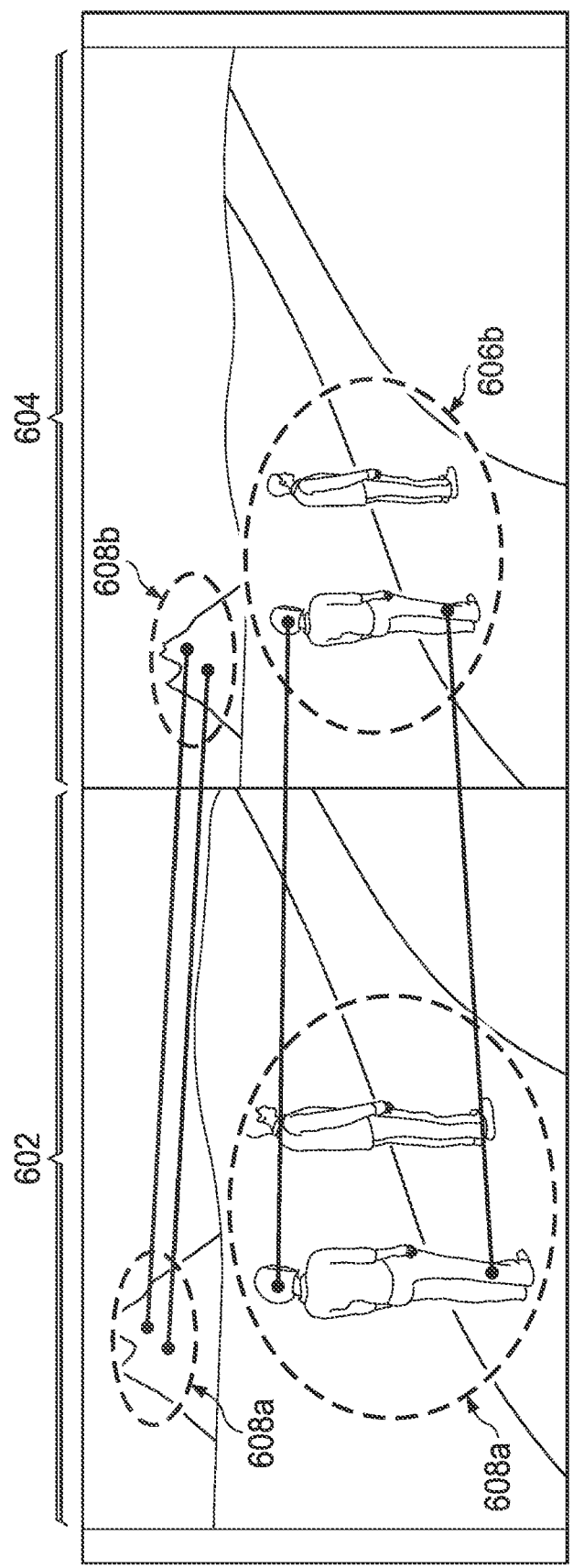
FIG. 6 is a diagram showing detection of features indicating an establishing shot in a portion of a video item, according to some embodiments of the present disclosure.

FIG. 6 is a diagram showing detection of features indicating an establishing shot. FIG. 6 illustrates images of two different frames 602, 604. The primary features 606a, 606b detected within the frames are people and the secondary features 608a, 608b detected within the frames 602, 604 include scenery. The shot category may be assigned by comparing the features between the two frames 602, 604. A comparison of the relation between the primary feature 606a and the secondary feature 608a of the first frame with the relation between the primary feature 606b and the secondary feature 608b of the second frame 604 shows that the distance between the two changes and that one relative dimensions (for example, height) of the identified features changes while another dimension (for example, width) does not change or does not change as much. This may indicate that the shot includes vertical movement of the camera relative to the identified features. In other words, the trace lines between corresponding points within the frames are not completely horizontal but are instead slightly diagonal. The relatively shallow slope of the lines indicates that while there is some motion between the two frames 502, 504, it is not a sudden or quick motion. Additionally, the primary features 606a (i.e., the people) take up a relatively small amount of space compared to the image. Based on this information, it may be determined that the shot is an establishing shot. Thus, the shot may be categorized accordingly.

Figure 7:
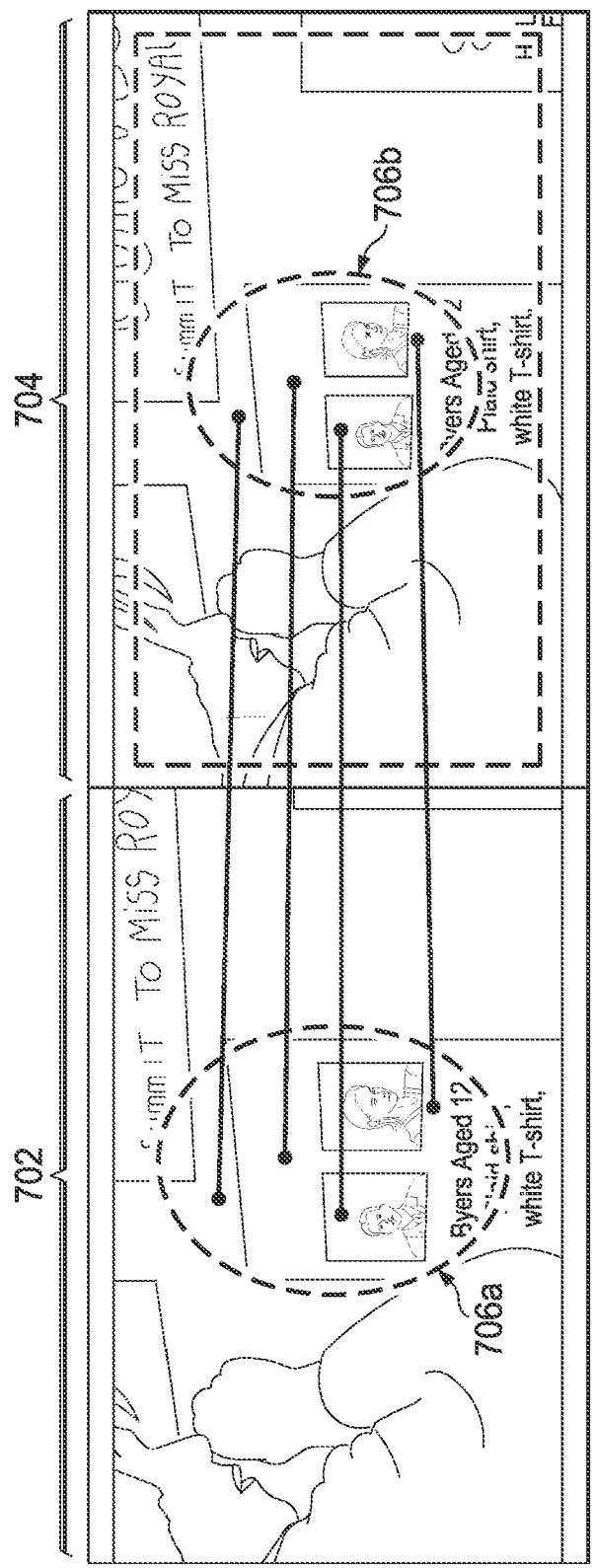
FIG. 7 is a diagram showing detection of features indicating a zoom-out shot in a portion of a video item, according to some embodiments of the present disclosure.

FIG. 7 is a diagram showing detection of features indicating a zoom-out shot. FIG. 7 illustrates images of two different frames 702, 704. The features 706a, 706b detected within the frames include an object of focus at which the character is looking. The shot category may be assigned by comparing the features between the two frames 702, 704. A comparison of the relative size of the features 706a in the first frame and the relative size of the features 706b in the second frame 704 shows that the relative size changes. Specifically, the features 706b within the second frame 704 are smaller than the corresponding features 706a of the first frame 702. The converging nature of the trace lines between corresponding points suggests that the corresponding features are smaller in the second frame 704 than they are in the first frame 702. Based on this information, it may be determined that the shot is a zoom-out shot. Thus, the shot may be categorized accordingly. If it had been determined that the features 706b within the second frame 704 were larger than the corresponding features 706a of the first frame 702, then it may have been determined that the shot is a zoom-in shot.

FIGS. 5-7 illustrate a few examples of detecting features within shots to assign a shot category to such shots. Other types of shots may be detected as well. Additionally, other types of functions for identifying different types of shots may be used in some embodiments of the rebuffering point identification modules described herein.

FIG. 8 is a flowchart showing an illustrative method for pausing video item at specified rebuffering points. The method 800 includes several enumerated steps or operations. Embodiments of the method 800 may include additional steps before, after, in between, or as part of the enumerated steps. Some embodiments may omit one or more of the enumerated operations. Additionally, some embodiments of the method 800 include non-transitory machine-readable media having instructions stored thereon that cause a processor to perform all or some of the described operations. According to the present example, the method 800 includes an operation 802 for receiving a streaming video item into a buffer or extracting or reading data that comprises the streaming video item. The video item may be, for example, a full-length movie or an episode of a series. Other examples of video items are contemplated as well. The video item may be delivered as a stream. In other words, the video item is displayed by a client device while data is still being transferred to the client device from a server device. Thus, the video item can begin presentation before it is entirely downloaded to the client device.

The method 800 further includes an operation 804 for outputting the video item from the buffer to a display system. The display system may include, for example, a visual output device such as a screen and an audio output device, such as a set of speakers or a connection thereto. Outputting the video item from the buffer to the display system consumes the data within the buffer. When viewing streaming video items in such a manner, data representing a video item is received from the remote server into a local buffer. Conventionally, if such data within the buffer is consumed for presentation before additional data can be delivered, the video item has to pause to allow for rebuffering. Such rebuffering events do not take into account aspects of the content being rendered and can reduce the quality of experience by the viewer.

The method 800 further includes an operation 806 for determining that there is a specified rebuffering point within a predetermined time frame. The specified rebuffering point may correspond to a scene change, a shot change, or other point within the video item that is less inconvenient for a pause. The rebuffering points may be identified before the video item is streamed or may be identified by the client computing system as data is put into the buffer. The predetermined time frame may correspond to the data that is currently within the buffer. Specifically, the predetermined time frame may extend between the point in which the video is currently at and the point at which the buffer is entirely consumed. In some examples, there may be no specified rebuffering point within the unconsumed data within the buffer. However, it may be the case that such a rebuffering point will appear before the buffer is entirely consumed or a rebuffering event is otherwise triggered. Embodiments of the method 800 may include an operation of selecting a particular rebuffering point from among a plurality of potential rebuffering points, in response to determining that the buffer utilization falls below a predetermined threshold. The buffer utilization may be determined to fall below the predetermined threshold when the amount of data in the buffer falls below a predetermined data value or when the amount of data in the buffer is decreasing at a rate predictive of falling below a predetermined threshold within a predetermined amount of time. Accordingly, the determination may be an actual determination or a predictive determination. Additionally, some embodiments of the method 800 may include an operation of evaluating the buffer to determine a lever of buffer fullness or what percentage of memory allocated to the buffer is actually occupied as in order to determine whether a pause for rebuffering is necessary. In some embodiments, the evaluation of buffer fullness may be used to determine how long a pause for rebuffering should be or when a pause should be stopped.

The method 800 further includes an operation 808 for pausing the video item at the specified rebuffering point, in response to determining that there is a specified rebuffering point within the predetermined time frame and that rebuffering should be performed to avoid completely emptying the buffer. By pausing the video item at the specified rebuffering point instead of a random point determined only by the amount of data in the buffer, the inconvenience of the rebuffering event is lessened. Thus, a viewer is provided with a better experience while viewing the streaming content. In some instances, a rebuffering may be performed without the viewer perceiving the pause for rebuffering. Accordingly, while conventional implementations of rebuffering events generally include some alteration of the scene presented to the user to communicate that rebuffering is being performed (e.g., a spinning wheel appears over a frame), some embodiments of the present disclosure may not include any indication to the user that a rebuffering event is occurring. Because the rebuffering is performed at an identified, appropriate time the rebuffering is less noticeable to the users. For example, adding a single second showing a black frame at an identified fade out may not be perceived by the user as rebuffering, but simply as a longer transition in the video item.

Additionally, some embodiments of the client computing system 120 may "pause" the playback of the video item by stretching video and/or audio content that is present in the buffer. The client computing system 120 may interpolate video and audio information so that a given portion of video is stretched to increase in time. For example, the buffer 124 may include data that can be processed into five seconds of video. Some or all of this data can be "stretched" by adding additional frames or by displaying frames for longer periods of time to cause the data to be presented over six seconds, rather than five. The audio may be correspondingly stretched in a way that does not alter the pitch. In some embodiments, a Fourier spectrum of the relevant portion of the buffer audio may be used to create a spectral profile to synthesize similar audio content. For example, an establishing shot identified in a media item may be stretched from ten seconds to twelve seconds to permit two seconds of rebuffering to occur while the establishing shot is shown. The client computing system 120 may identify the establishing shot by metadata including a tag that indicates a rebuffering point associated with the shot. Accordingly, the client computing system 120 may provide a rebuffering response based on the type of rebuffering point being used for rebuffering.

In some embodiments, after a rebuffering point has been selected, the client computing system 120 may apply a fade-out to the data that is yet to be displayed by the display system 132. The fade-out may be provided to video and/or audio included in the buffered data. In some embodiments, when the rebuffering is likely to take a significant amount for time (e.g., more than 3, 5, or 10 seconds) a predetermined audio content may be presented. Similarly, a predetermined video content may be presented, such as a frame showing the title of the video item or a frame associated with a chapter or segment of the video item. When predetermined audio content is presented, the content may be designed for looping and may be obtained from the video item itself, such as a soundtrack of the video item. Such approaches may provide for a better user experience during extending rebuffering periods and may be included in embodiments of the method 800.

Some examples of processing systems described herein may include non-transient, tangible, machine readable media that include executable code that when run by one or more processors may cause the one or more processors to perform the operations of method 800 as described above. Some common forms of machine readable media that may include the operations of method 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Embodiments of the present disclosure may improve server and client systems utilized in a streaming media environment by optimizing the placement of rebuffering events. The optimized placement may be determined based on the data being streamed, the content of the data being streamed, and network conditions experienced by the client device. The optimized placement may improve these computing systems so as to provide for an improved user experience.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. The claims should be construed broadly and in a manner consistent with the scope of the embodiments disclosed herein. Accordingly, certain aspects of the present disclosure are set out the following numbered clauses:

1. A method comprising: receiving, with a computing system, data representing a video item into a buffer; outputting, with the computing system, the video item from the buffer to a display system; determining, with the computing system that utilization of the buffer falls below a predetermined threshold; in response to determining that the utilization of the buffer falls below the predetermined threshold, determining that there is a specified rebuffering point within a predetermined time frame; and pausing with the computing system, the video item at the specified rebuffering point in response to determining that there is the specified rebuffering point within the predetermined time frame.

2. The method of clause 1, further comprising resuming the video item after a predetermined amount of time, the predetermined amount of time being based on a rate at which the video item is received by the buffer.

3. The method of any of clauses 1-2, wherein the specified rebuffering point corresponds to one of: a shot change and a scene change.

4. The method of any of clauses 1-3 wherein the specified rebuffering point corresponds to a in which a frame motion value is below a predetermined motion value threshold.

5. The method of any of clauses 1-4, wherein the specified rebuffering point corresponds to a point at which values representing visual properties are below a predefined visual property threshold.

6. The method of any of clauses 1-5, wherein the specified rebuffering point is a pause in a dialogue of the video item.

7. The method of any of clauses 1-6, wherein the specified rebuffering point is selected from among a plurality of potential rebuffering points within the video item, the plurality of potential rebuffering points having different types, the different types being assigned different ranking values.

8. The method of clause 7, wherein the pausing the video item occurs only if the specified rebuffering point is above a specific rank.

9. The method of any of clauses 1-8, wherein the specified rebuffering point is identified within the video item before the video item is streamed to the computing system.

10. The method of any of clauses 1-9, wherein the specified rebuffering point is identified by the computing system while a portion of the video item in which the specified rebuffering point is positioned is within the buffer.

11. A method comprising: receiving, with a computing system, first data representing a video item into a buffer and second data indicating a set of specified rebuffering points for the video item; outputting, with the computing system, the first data representing the video item from the buffer to a display system; determining that a rate at which the first data is received is less than a rate at which the first data is output from the buffer to the display system by a threshold amount; and in response to determining that the rate at which the first data is received is less than the rate at which the first data is output to the display system by the threshold amount, pausing the media stream at one of the set of specified rebuffering points.

12. The method of clause 11, wherein the set of specified rebuffering points includes shot changes, scene changes, scenes with predefined visual characteristics, and pauses in dialogue.

13. The method of clause 12, wherein different types of rebuffering points are assigned different rankings.

14. The method of clause 13, wherein the one of the set of specified rebuffering points is selected based on a difference the rate at which the first data is received and the rate at which the first data is output from the buffer to the display system.

15. The method of clause 14, wherein a subset of acceptable rebuffering points from which the selected rebuffering point is selected includes additional types of rebuffering points as the difference increases.

16. The method of any of clauses 13-15, further comprising pausing the media stream at a plurality of rebuffering points of the set of rebuffering points, wherein a pause at each of the plurality of selected rebuffering points is for a different period of time based on a ranking value assigned to that rebuffering point.

17. The method of any of clauses 11-16, wherein a period of time for which the video item is paused is based on a prediction of when the buffer will be below a predetermined value.

18. A method of optimizing placement of a rebuffering event in steaming media playback, the method comprising: receiving, with a server computing system, a streaming video item; performing image processing to identify a plurality of specified rebuffering points in the steaming video item; storing, in a memory, information characterizing the identified plurality of specified rebuffering points; and transmitting the information characterizing the identified plurality of specified rebuffering points over a network to a client computing system.

19. The method of claim 18, wherein the information characterizing the identified plurality of specified rebuffering points includes at least one of: timestamps and frame numbers associated with a specified rebuffering point and a tag indicating a rebuffering point type associated with each specified rebuffering point.

20. The method of claim 18, further comprising transmitting the streaming video item to the client computing system, wherein transmitting the streaming video item is performed in connection with the transmitting the information characterizing the identified plurality of specified rebuffering points.

What is claimed is:

1. A computer-implemented method comprising:
    receiving, at a client device, video stream data from a video streaming source;
    selecting a specified rebuffering point from among a plurality of potential rebuffering points that are currently available for selection within the video stream data according to a determined level of need for rebuffering at the time of selecting, such that a first rebuffering point is selected at a determined first level of need and a second, different rebuffering point is selected at a second, different level of need; and
    pausing playback of the video stream data at the selected rebuffering point.

2. The computer-implemented method of claim 1, wherein the specified rebuffering point is selected upon determining that a buffer of the client device includes less than a minimum specified amount of video stream data.

3. The computer-implemented method of claim 1, wherein the plurality of potential rebuffering points are assigned different ranking values.

4. The computer-implemented method of claim 1, wherein the selected rebuffering point corresponds to a pause in a dialogue in a video item represented by the video stream data.

5. The computer-implemented method of claim 1, wherein playback of the video stream data is paused for a variable amount of time based on one or more factors.

6. The computer-implemented method of claim 2, wherein at least a portion of the video stream data is applied to the buffer of the client device during the pause.

7. The computer-implemented method of claim 2, wherein the selected rebuffering point is identified by the client device while a portion of the video stream data in which the selected rebuffering point is positioned is within the buffer.

8. The computer-implemented method of claim 2, wherein a period of time for which playback is paused is based on a prediction of when the buffer will be below a predetermined value.

9. The computer-implemented method of claim 3, wherein pausing the video stream data is overridden unless the selected rebuffering point is above a specified rank.

10. The computer-implemented method of claim 4, wherein the selected rebuffering point is identified within the video stream data as the video item is streamed to the client device.

11. The computer-implemented method of claim 5, wherein the one or more factors on which playback pause time is based includes a current rate at which the video stream data is being received at the client device.

12. The computer-implemented method of claim 5, wherein the amount of video stream pause time is dynamically varied based on the one or more factors.

13. The computer-implemented method of claim 12, wherein the one or more factors on which playback pause time is based includes current data transfer network conditions.

14. The computer-implemented method of claim 13, wherein the amount of time the video stream data is paused is dynamically varied as the current data transfer network conditions change.

15. A system comprising:
    at least one physical processor; and
    physical memory comprising computer-executable instructions that, when executed by the physical processor, cause the physical processor to:
        receive video stream data from a video streaming source;
        select a specified rebuffering point from among a plurality of potential rebuffering points that are currently available for selection within the video stream data according to a determined level of need for rebuffering at the time of selecting, such that a first rebuffering point is selected at a determined first level of need and a second, different rebuffering point is selected at a second, different level of need; and
        pause playback of the video stream data at the selected rebuffering point.

16. The system of claim 15, wherein the plurality of potential rebuffering points comprise multiple different types of rebuffering points.

17. The system of claim 15, further comprising resuming the video stream data after a predetermined amount of time, the predetermined amount of time being based on a rate at which the video stream data is received at a buffer.

18. The system of claim 15, wherein the selected rebuffering point corresponds to a portion of the video stream data in which a frame motion value is below a predetermined motion value threshold.

19. The system of claim 16, wherein playback of the video stream data is paused for a variable amount of time, and wherein the variable amount of time is based on the type of the selected rebuffering point.

20. A non-transitory computer-readable medium comprising one or more computer-executable instructions that, when executed by at least one processor of a computing device, cause the computing device to:
    receive, at a client device, video stream data from a video streaming source;
    select a specified rebuffering point from among a plurality of potential rebuffering points that are currently available for selection within the video stream data according to a determined level of need for rebuffering at the time of selecting, such that a first rebuffering point is selected at a determined first level of need and a second, different rebuffering point is selected at a second, different level of need; and
    pause playback of the video stream data at the selected rebuffering point.

* * * * *